United States Patent [19]

Wean

[11] Patent Number: 4,658,697
[45] Date of Patent: Apr. 21, 1987

[54] TRAINING MOUTHPIECE FOR BRASS INSTRUMENTS

[76] Inventor: Ellis Wean, 1896 Lionel Groulx, Montreal, Quebec, Canada, H3J 2P2

[21] Appl. No.: 890,921

[22] Filed: Jul. 31, 1986

[51] Int. Cl.⁴ .............................................. G09B 15/06
[52] U.S. Cl. ........................................ 84/465; 84/398; 84/453
[58] Field of Search ................... 84/398, 399, 453, 465

[56] References Cited

U.S. PATENT DOCUMENTS

| | | | | |
|---|---|---|---|---|
| 1,740,013 | 12/1929 | Gulick | .................................... | 84/398 |
| 2,504,336 | 4/1950 | Kleczka | ................................. | 84/398 |
| 3,721,151 | 3/1973 | Dimond | ................................. | 84/398 |
| 4,120,228 | 10/1978 | Windows | ............................. | 84/453 |

*Primary Examiner*—Lawrence R. Franklin
*Attorney, Agent, or Firm*—Kane, Dalsimer, Kane, Sullivan and Kurucz

[57] ABSTRACT

A training mouthpiece for brass instruments in which the walls of the mouthpiece are made of transparent material and the walls of the mouthpiece are of constant thickness to minimize or avoid distoration of view through the walls. The undistorted visual capacity enables a student or teacher of a brass instrument to clearly and undistortedly view the portion of the lips within the mouthpiece thereby providing additional information about the student.

7 Claims, 5 Drawing Figures

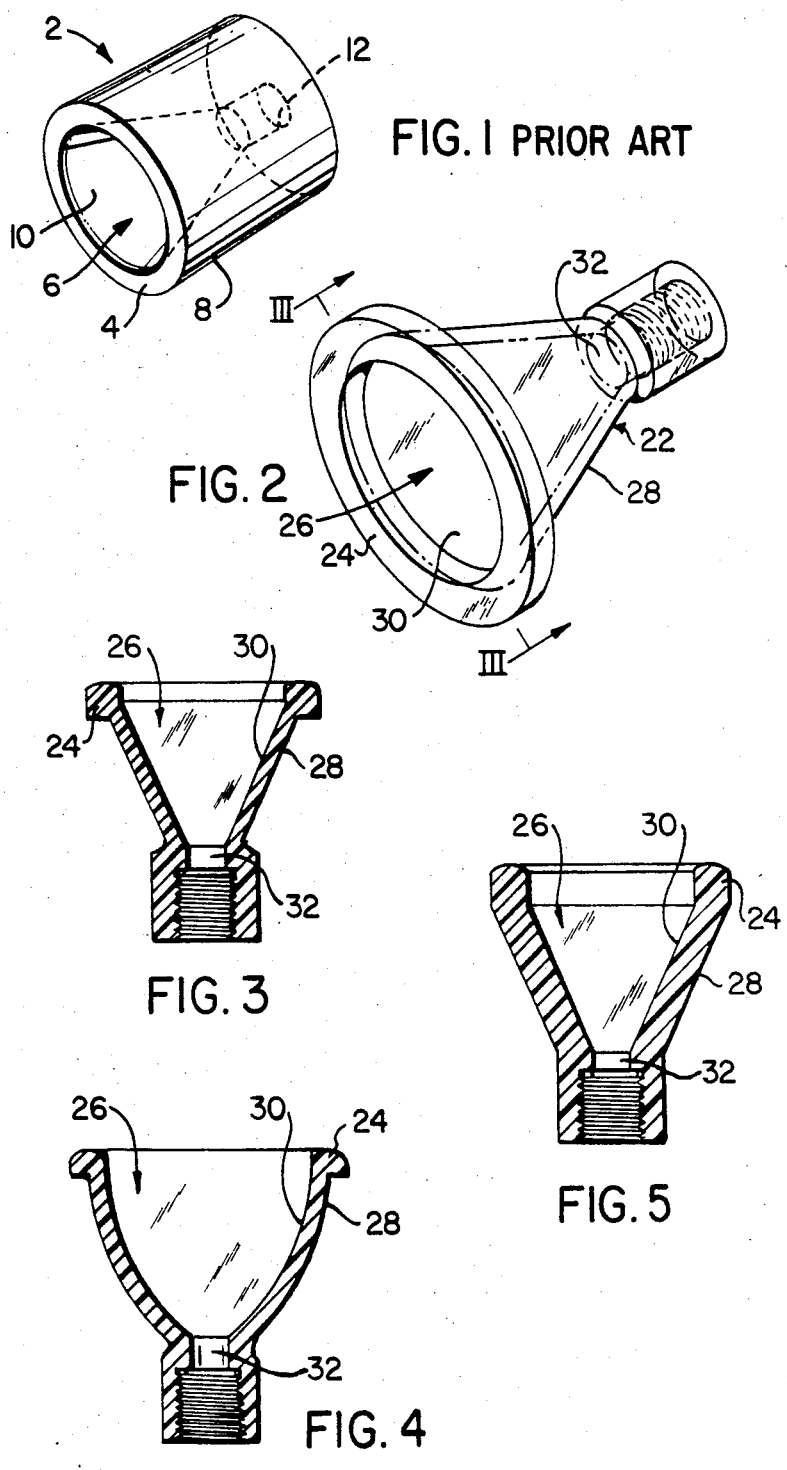

TRAINING MOUTHPIECE FOR BRASS INSTRUMENTS

BACKGROUND OF THE INVENTION

The present invention relates to a training mouthpiece for brass instruments.

Mouthpieces for brass instruments have remained essentially unchanged throughout the history of instruments which use vibrating lips to produce the sound. The interaction between the lips and mouthpiece must be explained first, by showing how the lips function, and then by discussing the role of the mouthpiece.

In examining lip function, it is necessary to perceive an imaginary line on each lip which divides inner lip from outer lip. These lines are held together with enough pressure to keep the mouth closed (this position may be described as being halfway between the sounds of the letters "M" and "P"). There should not be so much pressure that additional portions of inner or outer lip surface press against each other. While attempting to maintain this position, air is blown at the lips (from inside the mouth). When enough force is created against the inner lips they are momentarily forced open at the center. Air escapes through this opening and the air pressure against the inner lips is lowered until the lips' muscles strength regains dominance and allows the lips to spring closed once again. In actual playing, this process occurs as often in one second as the number of vibrations necessary to sound a given pitch (example: when playing A=440, the lips will actually open and close 440 times in one second).

The purpose of the mouthpiece is:

(1) to, as efficiently as possible, transmit the lip vibrations into the instrument;
(2) to create an airtight enclosure where the mouth and mouthpiece meet (where air might otherwise escape), making it easier to control the flow rate of the exhaled air and to help direct all of this air toward the center of the lips and, therefore, into the instrument;
(3) to assist the non-vibrating portion of the lips in staying closed (by pressing, to some extent, the mouth against the teeth and jaw); and
(4) to adjust for individual variations in jaw and lip structure by having a specific size mouthpiece to make lip function and (1), (2) and (3), above, interact and work as comfortably as possible. It is obvious that, when using a non-transparent mouthpiece, the only visible portion of the lips is the closed portion outside the mouthpiece. Teachers have traditionally felt that they have had an adequate amount of information about a student by simply studying this visible portion of the lips to see: (a) how the lips may overlap when they meet, and (b) by judging the height of the mouthpiece in relation to a horizontal line formed by the points where the lips meet (individual variations in physical make-up can mean that the imaginary lines dividing inner from outer lips can occur on different portions of either lip on the same player).

Most successful players have difficulty relating to physical needs other than their own, especially since the successful professional relies on his own imagination's perception of what he is doing. This may relate well to himself, but often not to others. A subjective concept within the teacher is often not well communicated verbally. On the other hand, our top brass performers are also naturally gifted and do not really have to be aware of how they achieve the results that others seek and envy. These performers are the most sought after teachers, but they have little information to share on how the lips function. In fact, the general attitude among most brass performers and accomplished non-professionals is that mechanical analysis is a musically destructive practice. This attitutde is quite universally accepted.

By way of prior art, U.S. Pat. No. 4,120,228 of Windows, Jr., describes and illustrates a handheld mouthpiece visualizer for training persons to use brass instruments. The rim of a brass instrument mouthpiece is mounted in spaced relation to a long rod, for holding. At the other end of the rod is a reflective surface so that the user of the mouthpiece rim may observe and thereby develop the appropriate embouchure (lip position). There are two problems with the "practicality" of such a device:

(1) The lip tissue is extraordinarily responsive and slight changes in air pressure can make a large visual and tonal difference. When someone plays a trumpet, for example, the mouthpiece funnels all the air into a narrow tube (called the "lead pipe" of the instrument). Since the player can provide air at a faster rate than the lead pipe can handle we have a "back-up" effect against the outside of the lips (inside the mouthpiece) called "back pressure". (Without an airtight seal in the training device "back pressure" cannot be created.) The combination of air pressure against the inner lips and back pressure against the outer lips (still we refer only to that portion of the mouth within the mouthpiece's inner rim) is crucial to the final lip position that is most conducive to the sound of the instrument. In a playing situation, the lips are somewhat "sandwiched" between the two air pressures and this gives added support to lip strength and strongly influences lip coordination. The lip muscles can actually relax a bit once they have attained this position because they are being helped so much by these pressures. When using the "embouchure visualizer" there is no back pressure and, therefore, the lip position formed under these circumstances in no way relates to the position formed and the strength used when playing the instrument.

(2) Even with the ability to "buzz" (a common reference to lip vibration) with a visualizer, there still is no instrument involved and, therefore, only the sound of the buzz as a reference guide, and, as stated before, this buzz is often produced from a non-playing lip position.

Transparent mouthpieces have been made in the past, to a limited extent in other countries. These have been made, however, as copies of existing non-transparent mouthpieces. Because of a continuous change in the thickness of the walls of the cup, from the rim to the throat, the view of the lips is distorted and of very limited viewing range. Variations in the thickness of a piece of transparent material change the size and shape of an image viewed through this material. When this variation in thickness conforms to the curvature of a single radius (this could be on both sides simultaneously or on one side if the other side is flat), and if the object to be viewed lies inside the focal point (which is determined by the particular radius/radii of the curve(s) combined with the distance the transparent material is held from the object), there is magnification. In the case of transparent copies of existing non-transparent mouthpieces, there are typically simultaneous changes in sizes both longitudinally and laterally along the mouthpiece cup, producing a very distorted image with limited viewing range.

It is the purpose of the present invention to produce a training mouthpiece cup for brass instruments, of excellent playing qualities and of visual capacity which is undistorted or of minimal distortion.

SUMMARY OF THE INVENTION

In accordance with the present invention, there is provided, in a training mouthpiece for a brass instrument, a mouthpiece which has a cup with walls, the walls having a transverse annular cross-section. The walls extend between a rim at the top of the cup and a throat for passage of air into the instrument at the base of the cup. The walls of the cup are made of transparent material and are constructed so that there is minimum visual distortion of the lips when viewed through the walls of the cup.

In a preferred embodiment, the mouthpiece cup is made of a transparent material such as acrylic plastic. In order to produce minimal distortion of the view of a player's lips through the walls of the training mouthpiece, the walls are preferably made of constant thickness from the lip to the throat of the mouthpiece. These walls may be, for example, of inverted conical shape from the rim to the throat, or curved inwardly from the rim to the throat.

The training mouthpiece according to the present invention provides, for the first time, a device that can show both a student and/or a teacher of brass instruments any mechanical flaws in the sound production of the player of the instrument, as a means of quickly correcting them.

BRIEF DESCRIPTION OF THE DRAWINGS

These and other objects and advantages of the invention will become apparent upon reading the following detailed description and upon referring to the drawings in which:

FIG. 1 is a perspective view of a previously known transparent mouthpiece model;

FIG. 2 is a perspective view of a training mouthpiece in accordance with the present invention;

FIG. 3 is a cross-sectional view of the mouthpiece of FIG. 2 along line III—III; and FIGS. 4 and 5 are vertical cross-section views of two alternative constructions of training mouthpieces in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to the drawings, there is illustrated in FIG. 1, a previously known but little used transparent mouthpiece model cup 2 for a brass instrument, comprising an upper rim 4 circumscribing a cup 6 formed from a cylindrical outer wall 8 and a conical inner wall 10. At the base of cup 6 is throat 12 to receive a shank (not shown) which connects to the instrument. As previously indicated, when one is using such a mouthpiece, the only visible portion of the user's lips is the closed portion about the mouthpiece. To make such a mouthpiece of transparent material, so that the musician or a teacher can view the lips does not provide an adequate solution to this problem, because of the distortion produced by viewing through the walls of such a mouthpiece, and the limited range of view.

The training mouthpiece 22, in accordance with the invention, as illustrated in FIGS. 2 and 3, comprises an upper rim lip portion 24, circumscribing a cup 26 formed by outer wall 28 and inner wall 30. Throat 32 is formed at the base of cup 26. The inner and outer walls 28 and 30 of cup portion 26, and preferably the entire mouthpiece 22, are made of a transparent material such as, for example, acrylic plastic. As can be seen in FIG. 3, the walls of cup 26, formed by outer wall 28 and inner wall 30 are of constant thickness. In this particular embodiment illustrated, the walls form a cup of inverted conical shape, the inner diameter of the inner wall 30 decreasing in constant fashion between rim lip 24 and throat 32.

In the variations of training mouthpieces in accordance with the present invention illustrated in FIGS. 4 and 5, the walls of cup 26 formed by outer wall 28 and inner wall 30 again are of constant thickness, but are inwardly curved, as illustrated, along a constant radius in vertical cross-section, between rim lip 24 and throat 32. The walls of cup 26 in the embodiment illustrated in FIG. 5 are of approximately the same thickness as that of rim lip 24; those of the embodiment of FIG. 4 have a thickness which is significantly less than that of rim lip 24.

In use, the training mouthpiece in accordance with the present invention takes the place of a conventional mouthpiece in the lead pipe of the appropriate brass instrument for which it is designed. (Obviously the size and shape of the training mouthpiece may be varied to suit the appropriate instrument and/or preference of the user, without departing from the spirit and scope of the present invention.) The transparency of the training mouthpiece in accordance with the present invention, as well as the constant thickness of the walls of the cup thereof, provide a view of the player's lips, either to a teacher or to the player himself (by way of a mirror) which is virtually unobstructed and with very little distortion. As well, the mouthpiece in accordance with the present invention, it will be understood, provides a significantly greater viewing area of the player's lips. The training mouthpiece in accordance with the present invention is intended primarily as a study device to enhance the results obtained on the brass performance mouthpiece. The device provides a world of potential information for both the student and teacher that previously has not existed. The device in accordance with the present invention, it is believed, will significantly increase the potential for developing successful careers in performing and teaching the playing of brass instruments.

Thus, it is apparent that there has been provided, in accordance with the invention, a training mouthpiece for brass instruments that fully satisifies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a training mouthpiece for a brass instrument, a mouthpiece having a cup with walls having a transverse annular cross-section, the walls extending between a rim at the top of the cup and a throat for passage of air into the instrument at the base of the cup, the improvement wherein the walls of the cup are made of transparent material and are constructed so that there is minimum visual distortion of the lips of a user when viewed through the walls of the cup.

2. A mouthpiece according to claim 1 wherein the entire mouthpiece cup is made of any transparent material.

3. A mouthpiece according to claim 1 wherein the mouthpiece is made from transparent acrylic plastic.

4. A mouthpiece according to claim 1 wherein the walls of the cups have a constant thickness from the lip to the throat.

5. A mouthpiece according to claim 4 wherein the inner diameter of the transverse annular cross-section of the walls diminishes constantly from the rim to the throat.

6. A mouthpiece according to claim 4 wherein the walls of the cup have an inverted conical shape between the rim and throat.

7. A mouthpiece according to claim 4 wherein the walls of the cup are curved inwardly from the rim to the throat, the curvature of the walls being constant.

* * * * *